United States Patent [19]

Bergman et al.

[11] 4,278,237
[45] Jul. 14, 1981

[54] APPARATUS AND METHOD OF THREADING A CLOSED FRAMED OPENING BY HELICOPTERS

[75] Inventors: Fred S. Bergman, Delta; Reginald P. Radelet, Maple Ridge, both of Canada

[73] Assignee: Lindsey Manufacturing Co., Azusa, Calif.

[21] Appl. No.: 98,382

[22] Filed: Nov. 29, 1979

[51] Int. Cl.³ .............................................. B66D 1/36
[52] U.S. Cl. ......................................... 254/134.3 PA
[58] Field of Search ............... 254/139.3 PA, 139.3 R; 403/303, 300, 322

[56] References Cited

U.S. PATENT DOCUMENTS

| | | | |
|---|---|---|---|
| 3,530,548 | 9/1970 | Gearin | 403/300 |
| 3,861,814 | 1/1975 | Fisher | 403/300 |
| 4,006,884 | 2/1977 | Lederhos | 254/139.3 PA |

Primary Examiner—Robert C. Watson
Attorney, Agent, or Firm—Sellers and Brace

[57] ABSTRACT

An apparatus and method of automatically threading successive closed framed openings by helicopter towing a line equipped with a separable coupling. The invention utilizes a short cable loop pre-threaded through each closed frame such as the throat of a stringing block which cable loop is provided at its ends with coupling halves releasably supported at the opposite ends of a trough overlying the framed opening to be threaded. A helicopter is manoeuvred to drop the towing line coupling into a trough where its halves are automatically separated and thereafter recoupled to a respective end of the cable loop. Subsequently, the forward coupling can be similarly separated for insertion of a second cable loop in the towing line at the next threading apparatus in the helicopter's path of travel.

30 Claims, 12 Drawing Figures

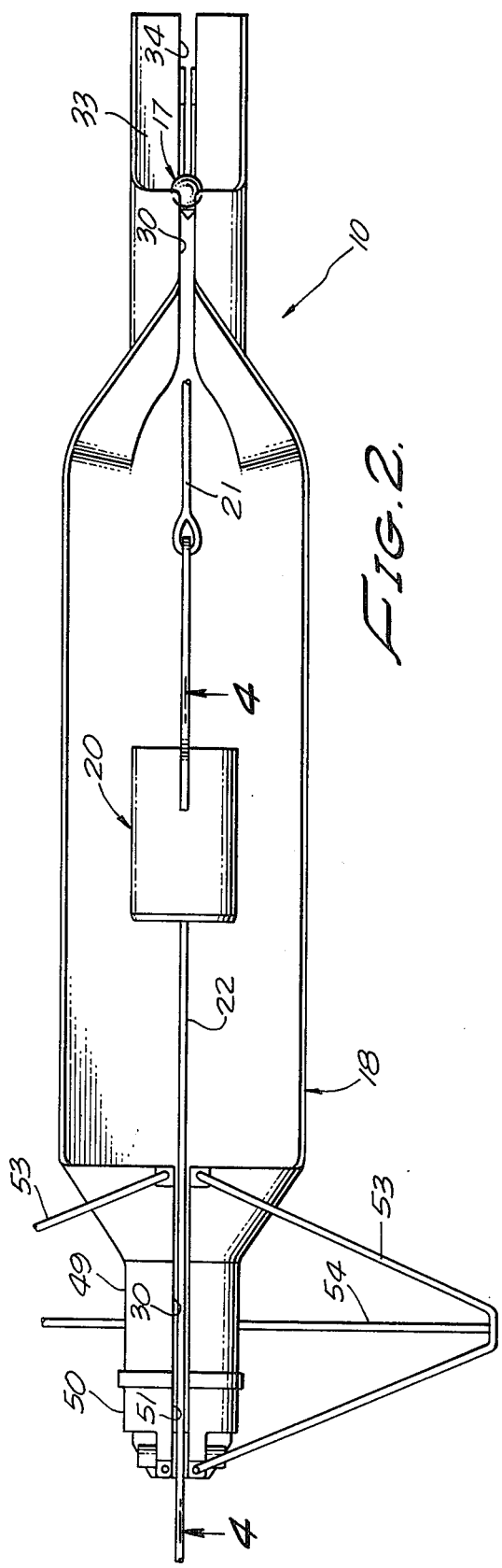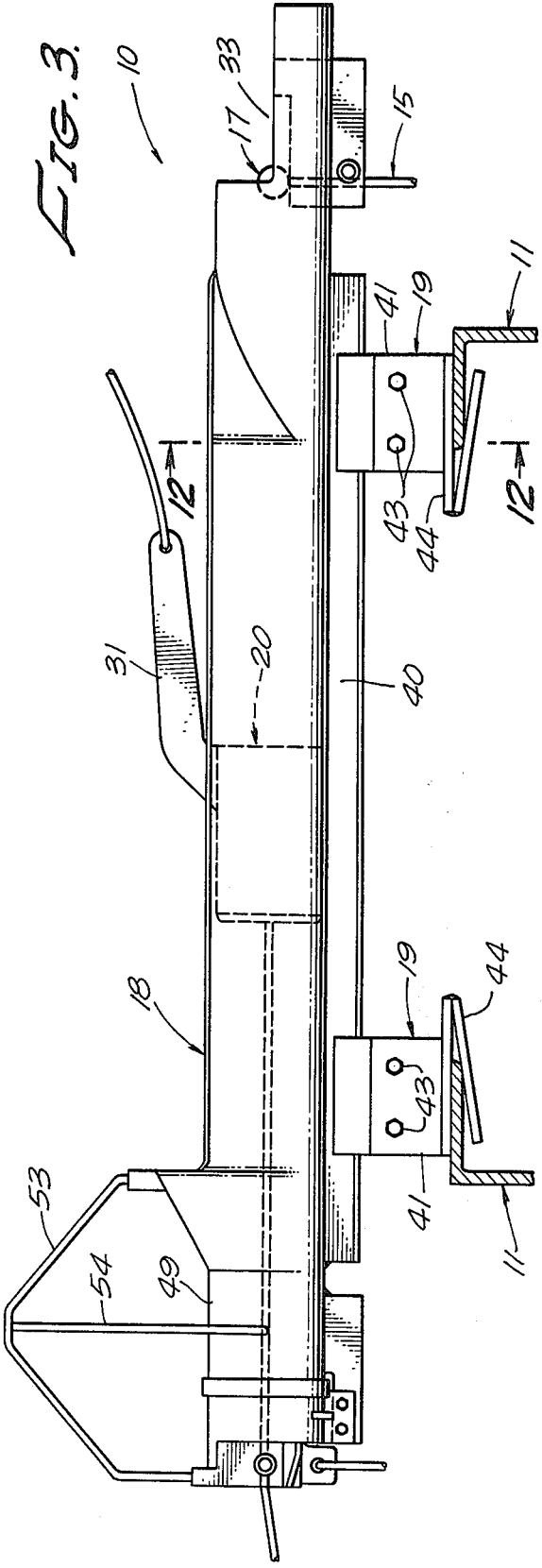

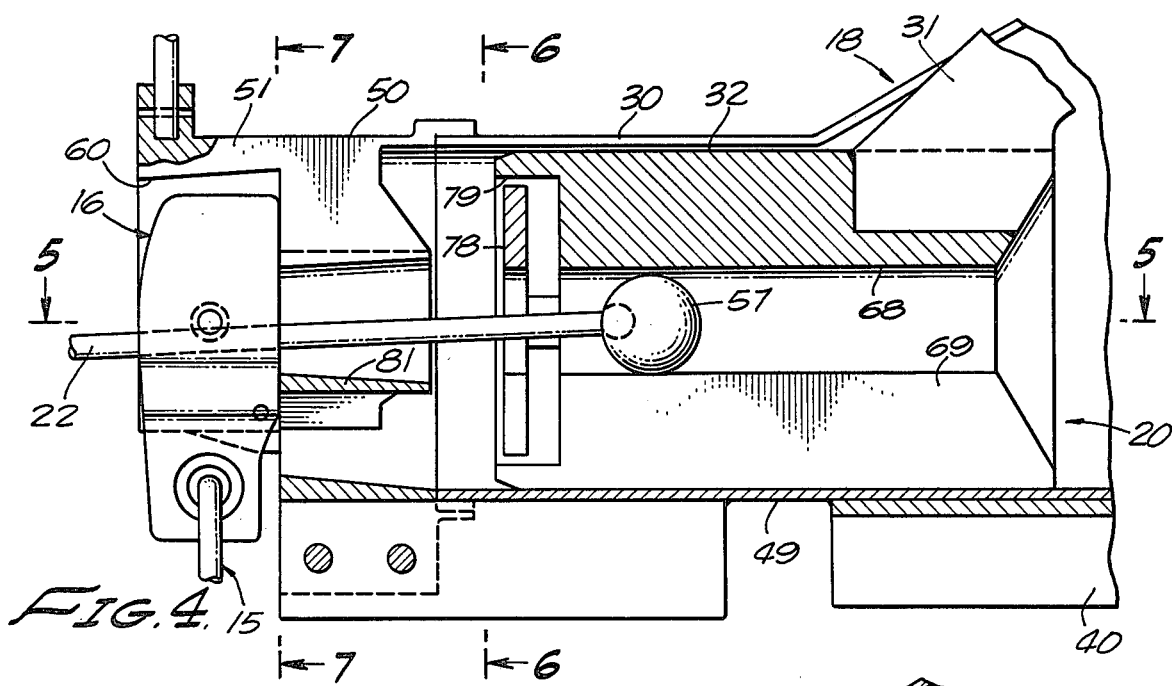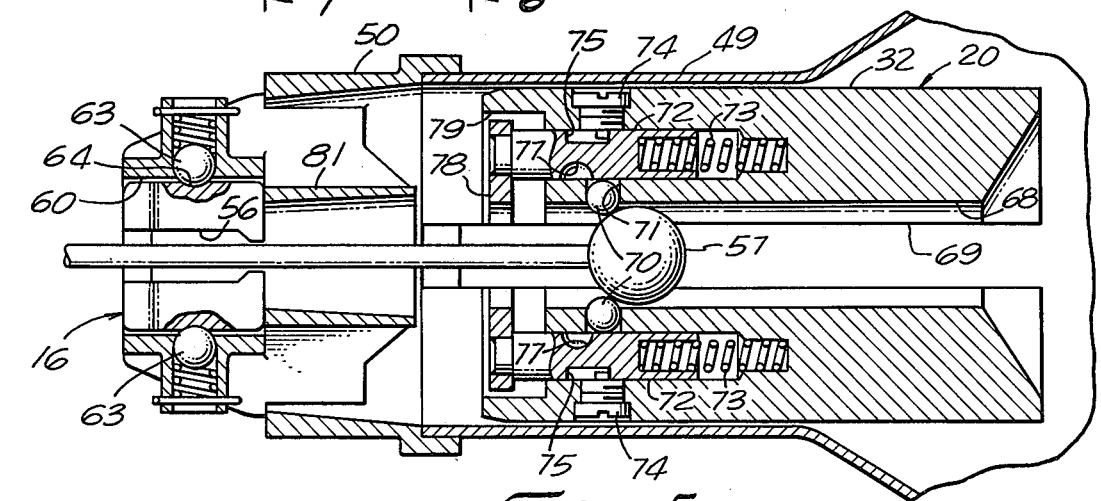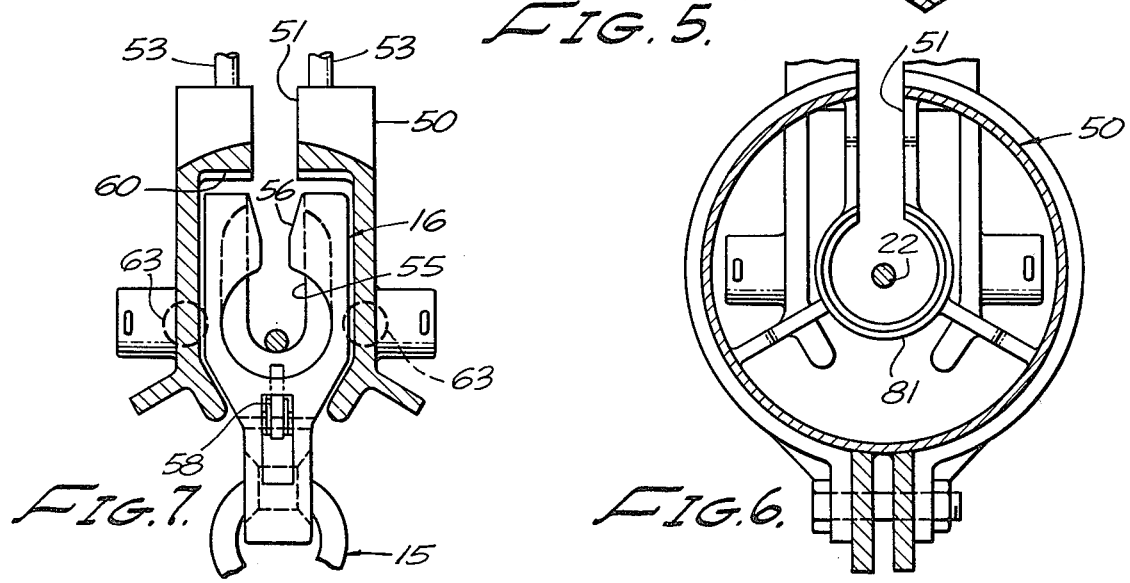

4,278,237

APPARATUS AND METHOD OF THREADING A CLOSED FRAMED OPENING BY HELICOPTERS

This invention relates to a method and apparatus for threading a towing line through one or more closed framed openings by helicopter and more particularly to unique and simpler automatic threading apparatus and separable coupling usable therewith.

BACKGROUND OF THE INVENTION

Various proposals have been made heretofore for utilizing helicopters to advance a conductor towing line along a power line while threading the towing line through a stringing block suspended from an insulator at each tower. Prior patents illustrative of these proposals include Lindsey et al U.S. Pat. No. 3,868,089; Chadwick U.S. Pat. No. 3,905,581; Bozeman U.S. Pat. No. 4,018,422; and Lederhos U.S. Pat. No. 4,006,884. Lindsey et al employs a stringing block having a split yoke bridged by a latch mechanism the prop for which is released by the passage of the towing line. The split yoke is subject to distortion and damage while the latch is open. Chadwick and Bozeman seek to avoid this risk by providing a rotating gate mechanism between the halves of a split yoke. These expedients are advantageous in part but at the cost of additional parts and numerous manufacturing tolerances adding to initial costs and maintenance problems. Lederhos proposes an entirely different approach by which a helicopter can be utilized to thread a towing line through any conventional closed frame such as the throat of a stringing block or between the legs of a power line tower bridged by cross frames at their tops. The separable coupling proposed by Lederhos and the expedient employed for separating it at a point intermediate of the ends of the cable loop are not as foolproof as is desirable in terms of reliability and safety of the aircraft and its pilot often operating over hazardous and inaccessible mountainous terrain.

SUMMARY OF THE INVENTION

The foregoing and other limitations and disadvantages of prior aerially conducted threading operations are avoided by this invention. The objectives are accomplished by the use of a troughlike structure mounted crosswise of the top of a power line tower or other framed opening, the trough being equipped at its opposite ends with means for releasably supporting the respective ends of a cable loop pre-threaded through the framed opening such as that provided by the tower itself and/or by a closed frame stringing block. The towing line is coupled to the helicopter by a separable coupling constructed to preclude the entrance of foreign matter. This coupling is designed for automatic opening upon rearward travel in the receiving trough after being dropped thereinto by a helicopter, whereupon the tension in the trailing end of the line acts to couple its male half to the female coupling at the trailing end of the cable loop. The helicopter then resumes its forward advance thereby pulling the leading half of the tow line coupling into engagement with coupling half at the leading end of the cable loop. These expedients ensure sequential and smooth insertion of the cable loop between the halves of the tow line coupling without risk of severe jolting forces on the helicopter and permits the helicopter to move upwardly and forwardly smoothly and safely as it resumes tensioning and advance of the tow line to the next tower at which the next cable loop is inserted between the leading half of the tow line coupling and the leading end of the adjacent cable loop.

Accordingly, it is a primary object of this invention to provide an improved method and unique apparatus for utilizing a helicopter to thread a conductor tow line through a framed opening by inserting a cable loop between the halves of a separable coupling in the tow line.

Another object of the invention is the provision of an improved method and apparatus for threading a tow line successively through suspended stringing blocks by inserting successive cable loops in series between the leading half of the tow line coupling and the trailing portion of the hauling line.

Another object of the invention is the provision of simplified and improved apparatus for uncoupling a separable coupling of an aerially advanced tow line and automatically inserting a cable loop in the tow line.

Another object of the invention is the provision of an improved separable coupling for use with a helicopter in threading a closed framed opening.

Another object of the invention is the provision of improved means for supporting an automatic threading device crosswise of the exterior of a framed opening.

These and other more specific objects will appear upon reading the following specification and claims and upon considering in connection therewith the attached drawing to which they relate.

Referring now to the drawing in which a preferred embodiment of the invention is illustrated:

FIG. 2 is a fragmentary top plan view of the trough device employed to uncouple the tow line coupling and recoupling the halves thereof to the respective ends of a cable loop;

FIG. 3 is a side elevational view of FIG. 2;

FIG. 4 is a fragmentary cross sectional view on an enlarged scale taken generally along line 4—4 on FIG. 2 but showing the hauling line coupling closely approaching the left hand end of FIG. 2 and about to be automatically uncoupled;

FIG. 5 is a cross sectional view taken along line 5—5 on FIG. 4;

FIG. 6 is a cross sectional view taken along line 6—6 on FIG. 4;

FIG. 7 is a fragmentary cross sectional view taken along line 7—7 on FIG. 4;

THE THREADING DEVICE GENERALLY

Figure 1:
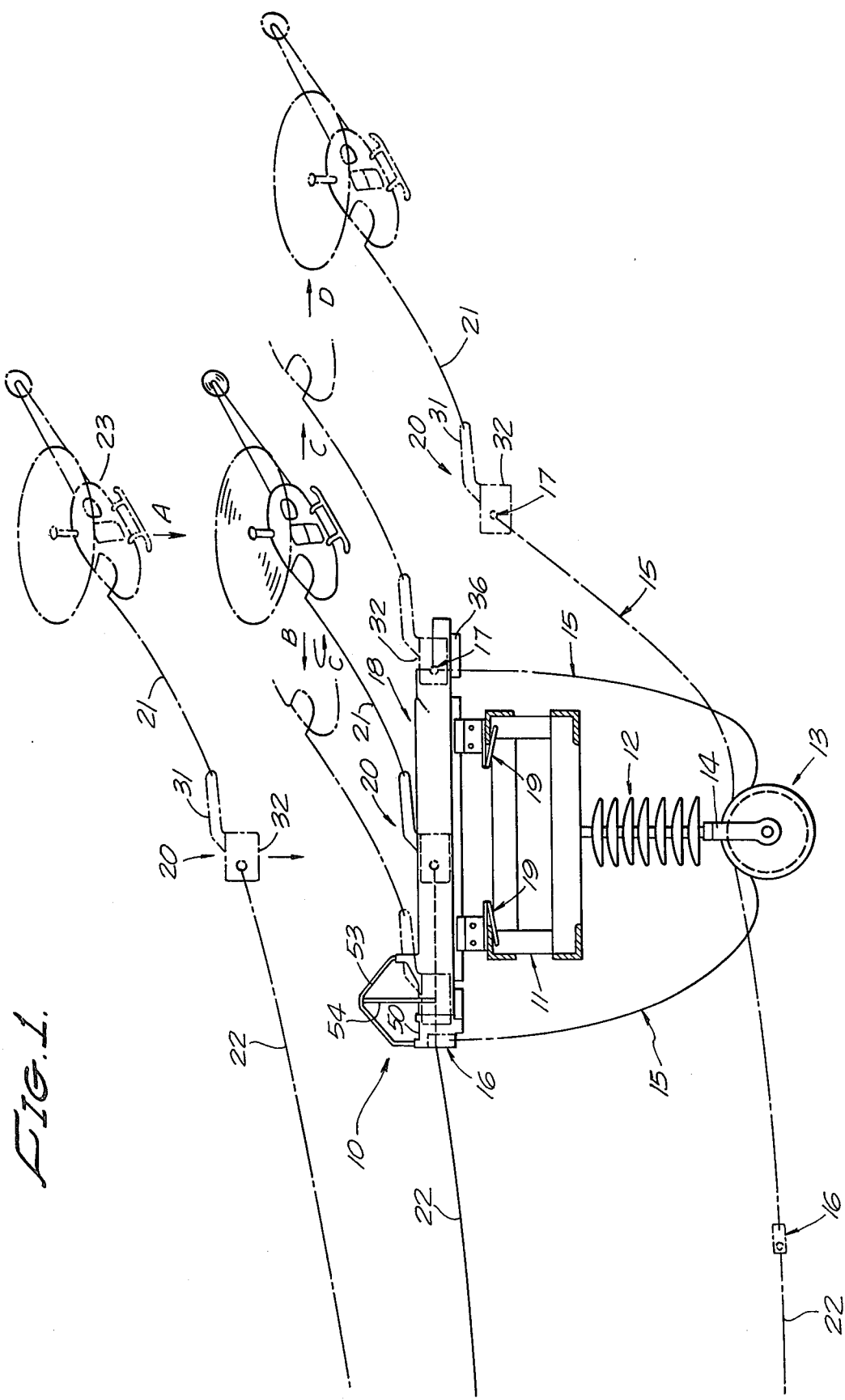
FIG. 1 is a diagrammatic view, partly in cross section, depicting successive manoeuvring movements of a helicopter in completing a threading operation utilizing an illustrative embodiment of this invention, the arrows A, B, C and D, indicating the successive directions of the helicopter in completing a threading operation.

Referring initially more particularly to FIGS. 1 to 3 and 12, the invention threading apparatus, designated generally 10, is shown clamped transversely of the cross frame 11 of a power line tower. The midlength of cross frame 11 typically supports the central conductor on the lower end of an insulator 12. A multi-sheave bundle stringing block 13 customarily employed in stringing bundle type power conductors is suspended by its frame 14 from the lower end of insulator 12 while the bundle conductor is being towed into position for connection to the insulator in lieu of stringing block 13. It will therefore be recognized that insulator 12 is suspended from the mid-section of the cross frame 11 interconnecting the inner and outer legs of the tower, not shown. Since the cross frame and the tower legs form a framed opening, a helicopter commonly employed for dropping a lightweight towing line for the main conductor hauling line cannot drop the tow line into the throat of a stringing block frame in accordance with the practise known to the prior art and shown, for example, in the U.S. Pat. No. 4,129,287 granted to Lindsey et al, Dec. 12, 1978. To circumvent this obstacle this invention utilizes a short length of flexible cabling, herein called a cable loop 15, having a female coupling attached to its trailing end and a rounded male coupling 17 attached to its leading end. These coupling halves are temporarily and releasably supported at the opposite ends of a trough 18 extending transversely of the tower cross frame 11. Trough 18 is rigidly clamped temporarily to the cross frame by clamps 19 which will be described in greater detail presently.

The remaining principal components of the threading apparatus comprise a separable tow line coupling 20 separably interconnecting the leading and trailing sections 21, 22 of the tow line. The leading end 21 is connected to helicopter 23 and the trailing end 22 leads to a supply reel not shown.

Before proceeding to describe structural details of the threading device it will be understood that the helicopter advances the hauling line from tower to tower. Initially it approaches a given tower in the highest position indicated in dot and dash lines in FIG. 1 until coupling 20 directly overlies the mid portion of trough 18. The helicopter then settles so as to deposit coupling 20 into the midlength of trough 18 and then moves a short distance to the left as indicated by arrow B allowing the tension in the hauling line to draw coupling 20 to the left hand end of the trough 18 where it is automatically uncoupled allowing its male component on the trailing end 22 of the line to become coupled to the female coupling 16 on the trailing end of cable loop 15. The helicopter then shifts forwardly, as indicated by arrow C, thereby trailing the female half of coupling 20 to the right and into coupling engagement with the right hand end of cable loop 15. The helicopter continues to move rightward as indicated by arrow D and, in so doing, carries the re-engaged coupling 20 forwardly toward the next tower with cable loop 15 now forming a section of the tow line.

DETAILED DESCRIPTION OF THE COMPONENTS

Figure 12:
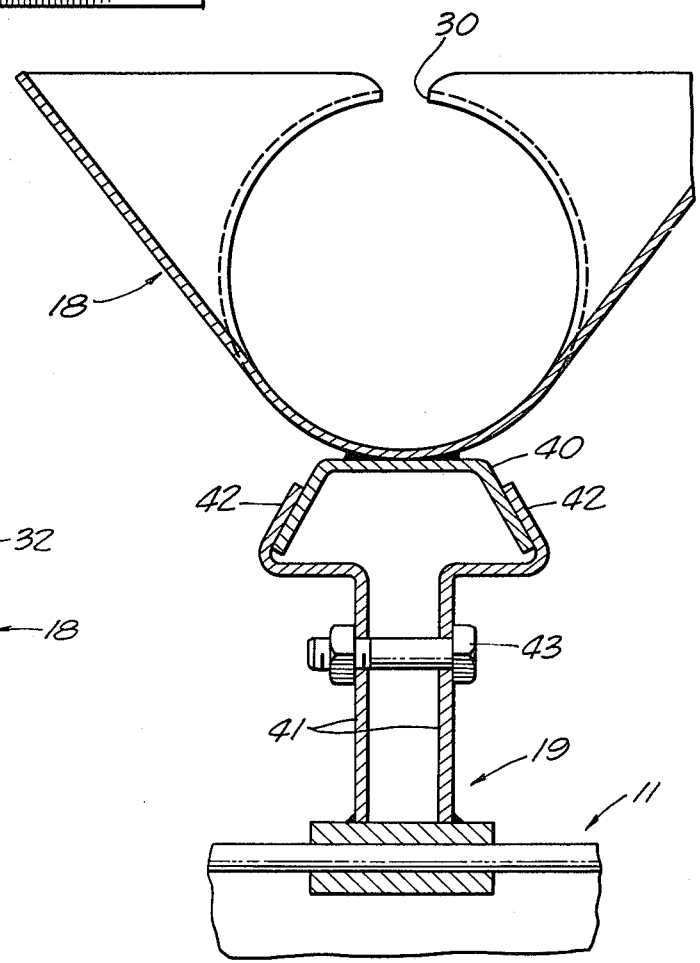
FIG. 12 is a cross sectional view on an enlarged scale taken along line 12—12 on FIG. 3 and showing details of the clamping means securing the threading apparatus crosswise of the top of a power line tower.

Referring to FIG. 2, 3 and 12, it will be seen that the main body of apparatus 10 comprises an open ended trough 18 all except the opposite ends of which flare upwardly at an obtuse angle best illustrated in FIG. 12. Each end is generally cylindrical in shape slotted lengthwise of the top thereof by a slot 30 sized to freely pass the tow line and the tongue like arm 31 rigidly attached to the periphery of the forward end of the female half 32 of coupling 20. The right hand end of trough 18 is provided with an upwardly opening socket 33 (FIG. 2). The bottom of this socket has an elongated slot 34 (FIG. 2) to receive the leading end of cable loop 15.

Figure 10:
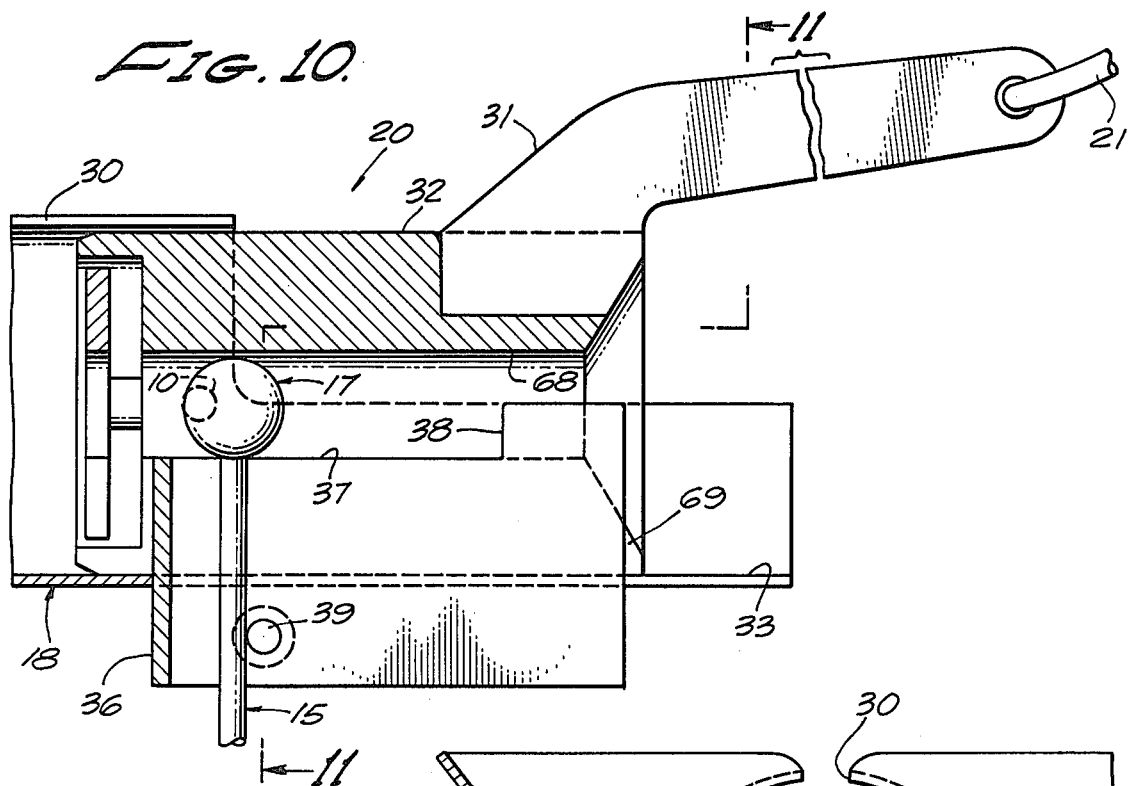
FIG. 10 is a vertical cross sectional view taken through the right hand end of the threading apparatus shown in FIG. 1.
Figure 11:
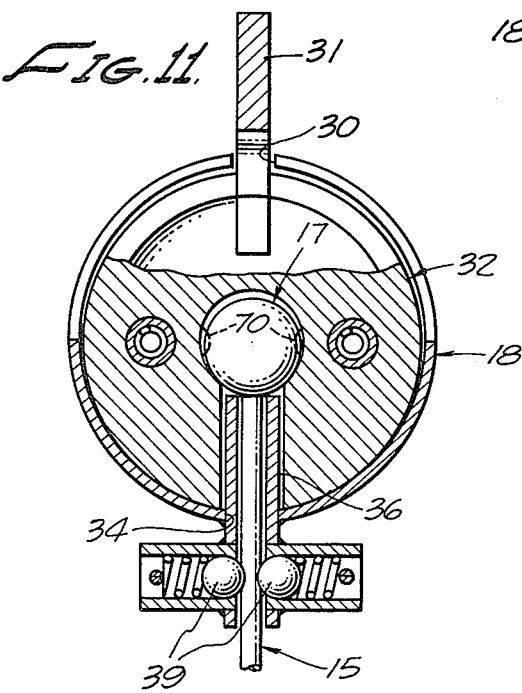
FIG. 11 is a cross sectional view taken along the broken line 11—11 on FIG. 10.

Referring more particularly to FIGS. 3, 10 and 11, it will be noted that male coupling half 17 of the cable loop 15 is supported on the upper edges of a forwardly facing U-shaped positioning plate 36 protruding through and welded to the edges of slot 34. As clearly appears from FIGS. 10 and 11, the upper edge 37 of U-plate 36 is positioned to support coupling 17 with its center in axial alignment with the right hand cylindrical portion of trough 18. A tang 38 projects upwardly from the outer end of member 36 to safeguard against the coupling half becoming accidentally and prematurely dislodged from its seat. Additionally, a pair of spring biased ball detents 39 are pressed towards one another in aligned housings carried by the legs of U-shaped member 36 to hold cable loop 15 and coupling half 17 in proper position for coupling engagement with the cylindrical male half 32 of the tow line coupling 20. Cable loop 15 is manually pressed past balls 39 and cooperates with the bight portion at the inner end of the U-shaped member 36 in holding the cable loop and sphere 17 captive preparatory to coupling engagement with coupling member 32.

Before leaving FIG. 12, it will be noted that a channel shaped guide rail 40 with flaring sidewalls is welded to the bottom of trough 18. A pair of identical clamping assemblies 19 is slidable lengthwise of rail 40 and includes a pair of brackets 41 the upper ends 42 of which converge to loosely engage the sidewalls of rail 40. Ends 42 can be forced into snug clamping relation with rail 40 by tightening clamping bolts 43. Welded to the lower ends of brackets 41 is a V-shaped jaw 44 for receiving the horizontal flange of the tower cross frame 11.

Referring to FIGS. 2-6, it will be observed that the outwardly flaring sidewalls of trough 18 converge and merge with a cylindrical section 49. The uppermost portion of these converging and cylindrical walls have a slot 30 accommodating both the tow line and tongue 31 of the female coupling 32 of the tow line. Accordingly, slot 30 permits tongue 31 to advance rearwardly until the two halves of coupling 20 are disengaged by means to be described presently.

Cupped over and welded to the rear end of member 49 is an end cap 50 having two important principal functions, namely, uncoupling the halves of coupling 20 and releasably supporting the female coupling half 16 on the trailing end of cable loop 15. End cap 50 has a deep vertical slot 51 through which the trailing section 22 of the hauling line drops when the helicopter manoeuvres coupling 20 between the positions associated with arrows A, B and C in FIG. 1. Extending upwardly and outwardly from the opposite sides of the aligned slots 30 and 51 are V-shaped guide horns 53, 53 (FIGS. 2 and 3) supported by brace rods 54. These guide horns supplement the flaring sidewalls of trough 18 in guiding tow line 22 into trough 18 and assuring that the line enters slots 30 and 51 at the rear end thereof.

Figures 8, 9:
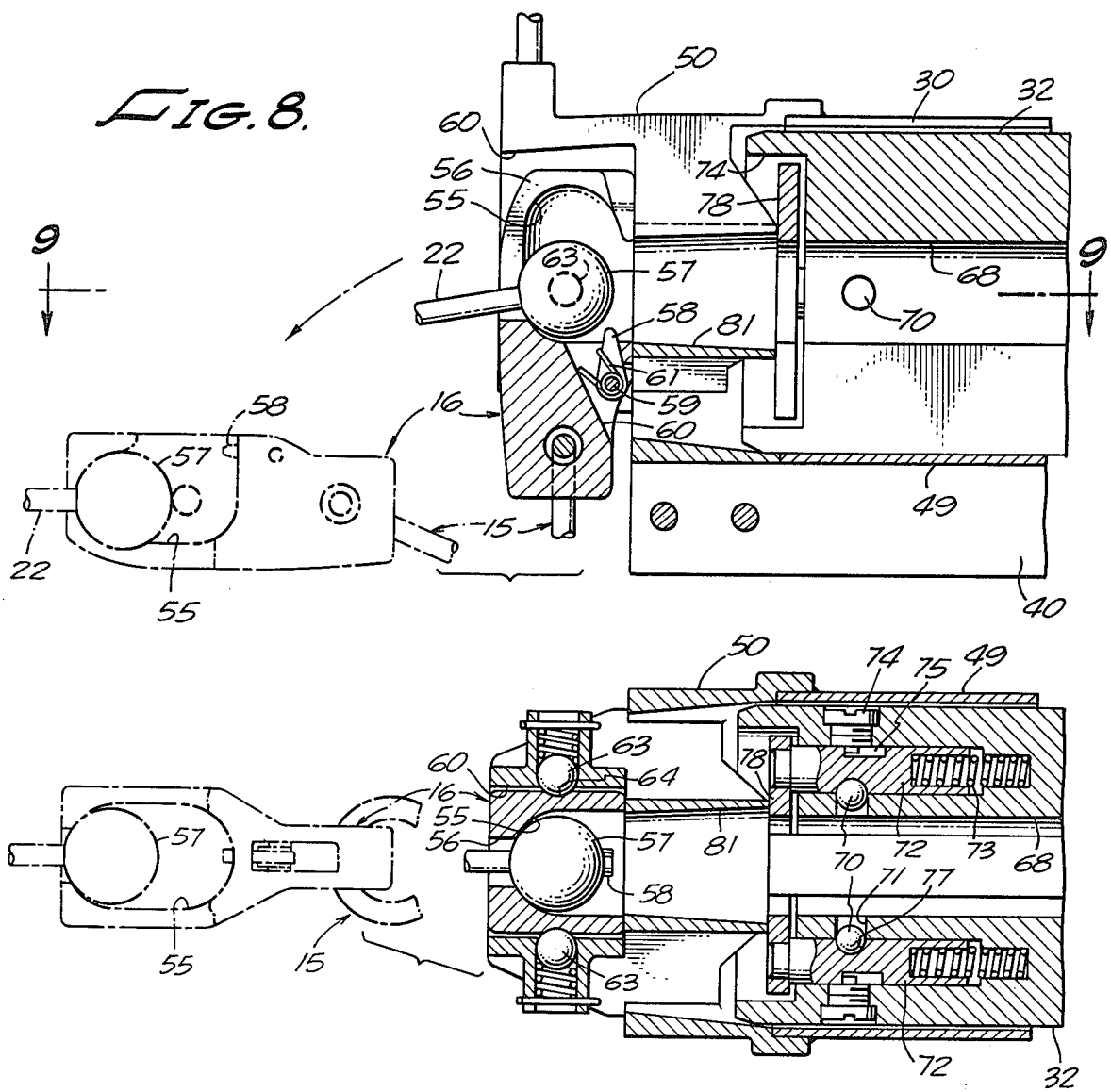
FIG. 8 is a fragmentary cross sectional view similar to FIG. 4 but showing the tow line coupling separated with the male half seated in the female coupling on the trailing end of the cable loop.
FIG. 9 is a cross sectional view taken along line 9—9 on FIG. 8.

The female coupling 16 of the cable loop, best shown in FIGS. 4, 5, 8 and 9, has an elongated main body provided with an egg shaped socket 55 opening through one lateral edge of its mid-length, as clearly appears from FIG. 8. One end of coupling 16 is secured to the trailing end of cable loop 15 and its opposite end is slotted at 56 from end to end of socket 55 thereby to freely pass the trailing end 22 of the tow line. The male coupling half 57 fixed to the forward end of hauling line 22 is admitted into socket 55 upon release from coupling 20 and is locked coupled thereto by a locking pawl 58 (FIG. 8). Pawl 58 is pivotally supported on a pin 59 extending crosswise of a passage 60 in the body of coupling member 16. A torsion spring 61 encircles pin 59 and urges pawl 58 clockwise against a stop but permits the pawl to pivot counter-clockwise to admit sphere 57 into socket 55.

The outer end of cap 50 is provided with a generally rectangular pocket 60 loosely seating coupling 16 with the inlet of its socket 55 aligned with the axis of trough 18. As is best shown in FIGS. 5 and 9, coupling 16 is held releasably seated in socket 60 by spring biased ball detents seating in depressions 64 formed in the outer faces of coupling 16.

The hauling line coupling 20 and its release mechanism will now be described by reference to FIGS. 4, 5, 8 and 9. This coupling comprises a cylindrical main body or female half 32 and a sperical male half 57. Half 32 is tubular and formed from end-to-end with a keyhole passage including a bulbous central passage 68 sized to freely pass sphere 57 and with a slot 69 sized to freely pass cable loop 15. Slot 69 is diametrically opposite the hauling tongue 31 of coupling half 32 and permits the forward end of the cable loop to enter the forward end of slot 69 and to exit from its rear end.

The means releasably retaining halves 32 and 57 coupled together comprises a pair of ball detents 70 held captively assembled in aligned radial passages 71 in the main body of coupling half 32 (FIG. 5). Normally detent balls 70 are held locked in their inwardly extended position shown in FIG. 5 by a pair of locking pins 72 reciprocably supported lengthwise of half 32 and spring biased outwardly by a spring 73. Assembly screws 74 project into elongated notches 75 in pins 72 and limit their reciprocal movement. Each pin is provided with a semi-spherical socket 77 positioned to receive detents 70 when the pins are shifted to the right as viewed in FIG. 5. A split bumper ring is fixed to the outer ends of pins 72 and are located in a shallow axial well 79 at the trailing end of coupling half 32. This well provides adequate room for the operation of pins 72 and bumper ring 78 and safeguards against the accidental and unintended movement of the bumper.

The means for depressing bumper 78 and releasing female coupling member 57 from coupling half 32 comprises a tubular member 81 forming an integral part of end cap 50 and in axial alignment with the central passage 68 of coupling 20 and the inlet of socket 55 of coupling member 16 attached to the cable loop. The forwardly projecting larger diameter end of tubular member 81 is positioned to engage bumper 78 as the coupling moves rearwardly and to cooperate therewith in guiding the coupling sphere 57 through tube 81 and into the socket of coupling 16.

OPERATION

The operation of the automatic framed-opening threading device 10 will be readily apparent from the foregoing description of its components. Each stringing block or window frame to be threaded is equipped exteriorly and crosswise thereof with one of the threading devices 10 such as to the cross bar 11 of a power line tower. A cable loop 15 is installed at the opposite ends of the trough 18 with its male coupling member 17 installed at the leading end of the trough and its female coupling 16 gripped in pocket 60 at the trailing end of the trough as shown in FIG. 1. An aerial transport, such as helicopter 23, having tow line sections 21, 22 connected by the separable coupling 20 in clear viewing range of the pilot is then advanced toward the framed opening to be threaded. When the helicopter has approached to the uppermost position shown in FIG. 1 with coupling 20 directly overlying the mid-portion of the trough, the pilot lowers the aircraft to deposit coupling 20 into the mid-portion of the trough. Guide horns 53, 53, channel line 22 into slots 30 and 51. At this point, the pilot manoeuvres the aircraft slowly rearward as indicated by arrow B allowing the tension in the tow line to carry coupling 20 rearwardly in the trough, coupling 20 being guided by the converging rear end of the trough into tubular member 49. As the coupling approaches the tubular stop 81, bumper 78 engages the stop thereby depressing pins 72 thereby permitting the male coupling half 57 of the tow line to expand the detent balls 70 outwardly into recesses 77 (FIG. 9). Coupling half 57 then passes rearwardly through the tubular stop 81 into the pocket 55 of the cable loop coupling 16. As the coupling 57 enters the pocket it rocks pawl 58 (FIG. 8) counterclockwise whereupon string 61 immediately returns the pawl to its normal extended position to safeguard against separation of coupling halves 16 and 57. The weight and tension acting in the trailing end 22 of the tow line promptly releases coupling 16 from its retaining ball detents 63 (FIG. 5) and tensions the cable loop 15 the leading end of which continues to be held firmly captive in the leading end of trough 18.

The pilot then reverses the helicopter as indicated by arrows C, C and shifts the craft horizontally forward thereby shifting female half 32 of the coupling forwardly. The converging sidewalls of trough 18 (FIG. 2) engage tongue 31 of coupling half 32 and guide it into slot 30 in an upright position thereby assuring that the keyhole passage 68, 69 is properly oriented to receive cable loop 15 and its male coupling half 17. Coupling 17 is held captive near the rear end of keyhole passage 68, 69 by detent balls 70 which are locked against retraction by pins 72 and springs 73 (FIG. 5). Cable loop 15 is now fully inserted and locked assembled between tow line sections 21 and 22. This having been accomplished the pilot manoeuvres craft 23 forwardly in the direction indicated by arrow D thereby lifting coupling 20 upwardly out of the forward end of trough 18 and releasing the cable loop 15 from the ball detents 39, 39 (FIGS. 10, 11).

The pilot now moves forwardly to the next closed frame or window equipped with one of the threading devices 10 thereby advancing the tow line through the throat of the first stringing block 13. The manoeuvring operations described above are then repeated to insert the cable loop preassembled to the next threading device whereupon the second cable loop is inserted between the female half 32 of coupling 20 and the leading end of the previous cable loop.

While the particular apparatus and method of threading a closed framed opening by helicopters herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That improved method of inserting a loop cable between the two halves of a coupling in a main cable being towed by an aircraft comprising:

providing a loop cable equipped with a male and a female coupling means on a respective end thereof;

supporting said male and female coupling means in spaced apart relation on the opposite sides of means for uncoupling said main cable coupling;

advancing said main cable coupling to a position between said male and female coupling means and then uncoupling said main cable coupling by retrograde movement thereof against said uncoupling means, thereby releasing the rear part of said main cable coupling for rearward movement into automatic coupling engagement with the coupling at one end of said loop cable; and thereafter moving the forward part of said main cable coupling forwardly into automatic coupling engagement with the coupling on the other end of said loop cable.

2. That method defined in claim 1 characterized in the step of threading said loop cable through a framed window and supporting said female and male coupling means on the ends thereof on the opposite sides of said window frame whereby said main cable can be advanced through said window frame when said loop cable has been coupled between the coupling parts of said main cable.

3. That method defined in claim 2 characterized in the steps of advancing said main cable through a framed window provided at successive powerline towers each equipped on the exterior thereof with support means for said male and female coupling means for respective loop cables, and coupling said loop cables in succession between the separated coupling parts in said main cable as said main cable is advanced along the powerline.

4. That method defined in claim 1 characterized in the step of completing the coupling of the trailing end of said loop cable to said main cable before completing the coupling of the leading end of said loop cable to said main cable.

5. That method defined in claim 3 characterized in the steps of utilizing the gravity forces acting on the portion of said main cable between the two towers near the advance end of said main cable when uncoupling said main cable coupling means thereby to retract said rear part of said main cable coupling rearwardly into coupling engagement with the coupling part at the trailing end of said loop cable, and advancing the aircraft forwardly to couple the forward part of said main cable coupling into coupling engagement with the leading end of said loop cable.

6. That method defined in claim 1 characterized in the steps of providing one part of said main cable coupling with laterally projecting towing arm means and attaching said main cable to the outer end thereof.

7. That method defined in claim 1 characterized in the steps of supporting the coupling parts at the ends of said loop cable at the opposite ends of an elongated upwardly-facing trough means, and positioning the lateral edges of said trough means to cooperate with laterally projecting means on said main cable coupling to orient the same to a predetermined position to receive forward end of said loop cable.

8. That method defined in claim 6 characterized in the steps of supporting the coupling parts at the ends of said loop cable at the opposite ends of an elongated trough having its edges shaped to engage said towing arm means and orient the same toward a predetermined position as said main cable coupling moves into engagement with said coupling part at the leading end of said loop cable.

9. Apparatus for automatically inserting a loop cable between the halves of a coupling in a main cable while being towed comprising:

elongated trough means clampable crosswise of the exterior of a framed opening through which said main cable is to be hauled and which trough means is provided toward the trailing end thereof with coupling lock release means;

means supporting male and female coupling means on the ends of a loop cable at the opposite ends of said trough means and which loop cable is adapted to be threaded through a framed opening; and a main cable coupling having male and female halves equipped with releasable lock means holding the same normally locked together and releasable upon rearward movement thereof into engagement with said lock release means whereby the trailing half of said coupling retracts into coupling engagement with the loop cable coupling at the trailing end of said trough means thereby permitting the leading half only of said main cable coupling to be towed forwardly into engagement with the coupling at the leading end of said loop cable.

10. Apparatus as defined in claim 9 characterized in that said trough means is provided at the opposite ends thereof with means for supporting a respective one of said loop cable male and female coupling means in proper position to receive and mate with a respective half of said main cable coupling upon separation of the coupling halves thereof.

11. Apparatus as defined in claim 9 characterized in that said female coupling half of said main cable coupling has an elongated main body provided with a keyhole passage from end-to-end thereof to accommodate passage of said loop cable and its male coupling half therealong.

12. Apparatus as defined in claim 11 characterized in that the leading end of said keyhole passage flares outwardly toward the rim of said main body.

13. Apparatus as defined in claim 9 characterized in that the male halves of said loop cable coupling and of said main cable coupling are similar and rounded to avoid hangup with other parts of said apparatus during the insertion of a loop cable between the ends of said towing cable.

14. Apparatus as defined in claim 11 characterized in that said female half of said main cable coupling and said trough means include means for shifting said female half into a predetermined position about the axis thereof as an incident to its movement toward mating engagement with the male half of a loop cable coupling means suspended in the forward end of said trough means.

15. Apparatus for automatically unlocking a coupling in a towed cable and inserting therebetween a second cable equipped at its ends with male and female coupling parts, comprising:

an elongated trough having means at the ends thereof for supporting the male and female coupling parts fixed to the ends of a second cable;

a towed cable having a separable coupling held assembled by lock release means actuatable to unlock the halves thereof from its trailing end upon retrograde movement of said coupling against an abutment adjacent the trailing end of said trough whereby the sidewise deposit of said separable coupling into the mid-length of said trough followed by slight slackening and retensioning of said towed cable effects; (1) the separation of said separable coupling and (2) the automatic recoupling of the halves thereof to a respective one of said male and female coupling parts of said second cable.

16. Apparatus of the type defined in claim 15 characterized in that said towed cable coupling comprises an elongated main body provided with a keyhole passage from end-to-end with the slot thereof opening through the side of said main body, and the male coupling of said separable coupling and the coupling part at one end of said second cable both having similar surfaces.

17. Apparatus of the type defined in claim 16 characterized in that the leading end of said trough includes means for releasably supporting said male half of said second cable.

18. Apparatus of the type defined in claim 16 characterized in that the trailing end of said trough includes means for releasably supporting the female half of said second cable in position to receive and interlock with said male half of said second cable.

19. Apparatus of the type defined in claim 18 characterized in that said female coupling comprises an elongated main body having one end attached to said second cable and provided with a slotted socket at the other end thereof having an inlet opening sized to admit the male half fixed to said towed cable and forming a part of said separable coupling, and the trailing end of said trough including means for supporting said female coupling half with said socket inlet positioned to admit said male half when released from the female half of said separable coupling.

20. Apparatus of the type defined in claim 18 characterized in that the female half of said second cable coupling includes retractable detent means operable to admit a male coupling half and to retain the same positively against disassembly.

21. Apparatus as defined in claim 16 characterized in that the forward end of said trough and the female half of said towed coupling include means cooperating to position said keyhole passage to receive the forward end of said second cable.

22. A separable coupling comprising an elongated main body having a keyhole passage extending therealong with the slot portion opening through the sidewall thereof;

means for attaching a line to one end of said main body;

detent means movably supported in said main body for movement into and out of the bulbous portion of said keyhole passage;

means carried by said main body normally locking said detent means in an extended position with a portion thereof projecting into the bulbous portion of said keyhole slot;

means for releasing said locking means to permit retraction of said detent means out of said bulbous portion thereby leaving said keyhole passage unobstructed from end-to-end thereof; and a generally rounded coupling member forming the other part of said separable coupling adapted to be attached to the end of a line and having a loose fit in the bulbous portion of said keyhole passage.

23. A separable coupling as defined in claim 22 characterized in that said main body is generally cylindrical, and said detent means being located toward the opposite end of said main body from said line attaching means.

24. A separable coupling as defined in claim 22 characterized in that said line attaching means includes a bracket projecting laterally from said main body.

25. A separable coupling as defined in claim 22 characterized in that said detent means comprises a plurality of balls movably and captively mounted radially of said main body, said locking means including actuating means reciprocable axially of said main body and projecting from one end thereof, and spring means normally holding said actuating means in position to lock said detent means extended.

26. A separable coupling as defined in claim 25 characterized in the provision of guard means on said main body embracing the portion of said actuating means projecting from said one end of said main body and effective to prevent accidental operation of said actuating means.

27. A separable coupling as defined in claim 24 characterized in that said bracket means is positioned generally in the plane of and generally diametrically opposite the slot portion of said keyhole passage.

28. A loop cable having a rounded male coupling member fixed to one end thereof and an elongated female coupling member fixed to the other end thereof, said female member having an elongated main body formed with a socket freely seating said male member and having an inlet therefor opening laterally through the side of the midlength of said female member, and a slot opening laterally from said socket and extending from said inlet across one end and along the opposite side of said socket.

29. A loop cable as defined in claim 28 characterized in the provision of detent means spring-biased to an extended position into said socket inlet and retractable to admit said male member and thereafter operable to prevent retrograde movement of said male member out of said inlet.

30. Apparatus for automatically inserting a loop cable between the separable coupling halves interconnecting adjacent lengths of a towed cable, said apparatus comprising:

a trough having open ends equipped with means for releasably supporting a loop cable provided at its ends with coupling halves mateable with a respective half of said separable coupling;

means adjacent one interior end of said trough to disengage the halves of said separable coupling upon movement thereagainst while present in said trough;

guide rail means secured lengthwise of the exterior of said trough; and a pair of clamping means carried by said guide rail means and at least one of which is adjustable therealong and including means for manipulating the same to clamp said trough rigidly to a support.

* * * * *